US009030912B2

(12) United States Patent
Wang et al.

(10) Patent No.: US 9,030,912 B2
(45) Date of Patent: May 12, 2015

(54) METHOD AND APPARATUS FOR SEPARATING AND COMPOSING SEISMIC WAVES

(75) Inventors: Yun Wang, Beijing (CN); Jun Lu, Beijing (CN)

(73) Assignee: Institute of geology and geophysics, Chinese Academy of Science, Beijing (CN)

( * ) Notice: Subject to any disclaimer, the term of this patent is extended or adjusted under 35 U.S.C. 154(b) by 885 days.

(21) Appl. No.: 13/175,817

(22) Filed: Jul. 1, 2011

(65) Prior Publication Data

US 2012/0002505 A1 Jan. 5, 2012

(30) Foreign Application Priority Data

Jul. 2, 2010 (CN) .......................... 2010 1 0224959

(51) Int. Cl.
*G01V 1/28* (2006.01)

(52) U.S. Cl.
CPC .......... *G01V 1/286* (2013.01); *G01V 2210/586* (2013.01); *G01V 2210/48* (2013.01)

(58) Field of Classification Search
CPC .............. G01V 1/286; G01V 2210/48; G01V 2210/586; G01V 1/36
USPC ........... 367/13, 16, 19–21, 24, 37–38, 40, 43, 367/47, 50–54, 56, 58, 63, 73, 75–76, 367/153–154; 702/5–6, 8, 11, 14, 16–18
See application file for complete search history.

(56) References Cited

U.S. PATENT DOCUMENTS

| | | | | |
|---|---|---|---|---|
| 4,203,161 A * | 5/1980 | Johnson et al. | ................ | 367/40 |
| 4,393,488 A * | 7/1983 | Gassaway et al. | ............. | 367/75 |
| 4,397,005 A * | 8/1983 | Gassaway et al. | ............. | 367/36 |
| 4,757,480 A * | 7/1988 | Gutowski | ........................ | 367/47 |
| 4,888,743 A * | 12/1989 | Thomsen | ........................ | 367/75 |
| 6,922,373 B2 * | 7/2005 | Armstrong | ..................... | 367/73 |
| 8,325,559 B2 * | 12/2012 | Hardage | ........................ | 367/21 |
| 2003/0195705 A1 * | 10/2003 | Leaney | .......................... | 702/14 |
| 2004/0015296 A1 * | 1/2004 | Causse et al. | .................. | 702/14 |
| 2004/0015297 A1 * | 1/2004 | Dubois et al. | .................. | 702/14 |
| 2005/0060099 A1 * | 3/2005 | Sorrells et al. | .................. | 702/14 |
| 2006/0133208 A1 * | 6/2006 | Broto et al. | ..................... | 367/50 |
| 2006/0153005 A1 * | 7/2006 | Herwanger et al. | ............ | 367/38 |
| 2006/0203613 A1 * | 9/2006 | Thomsen et al. | ............... | 367/38 |
| 2008/0033656 A1 * | 2/2008 | Herwanger | ..................... | 702/18 |
| 2008/0040043 A1 * | 2/2008 | Leurer et al. | .................... | 702/16 |

(Continued)

OTHER PUBLICATIONS

Dankbaar, J.W.M., Separation of P- and S-Waves, Geophysical Prospecting 33, 1985, pp. 970-986.

*Primary Examiner* — Isam Alsomiri
*Assistant Examiner* — Amienatta M Ndure Jobe
(74) *Attorney, Agent, or Firm* — David Ku

(57) ABSTRACT

An approach is provided for a multi-component seismic data processing that separates P-type and S-type seismic waves in an affine coordinate system. A method for separating and composing seismic waves comprises: determining base vectors of the seismic waves; transforming and separating the seismic wave in an affine coordinate system; and obtaining a signal with true amplitudes and eliminating a mode leakage phenomenon. Therefore, the method achieves the wave separation and recovers the amplitudes of separated waves simultaneously, which reduces noises to provide more precisely seismic data and to satisfy the requirement of seismic data analysis and processing.

10 Claims, 12 Drawing Sheets

(56) References Cited

U.S. PATENT DOCUMENTS

| | | | |
|---|---|---|---|
| 2008/0151691 A1* | 6/2008 | Eisner et al. | 367/38 |
| 2008/0172180 A1* | 7/2008 | Garotta | 702/14 |
| 2009/0010104 A1* | 1/2009 | Leaney | 367/47 |
| 2009/0070042 A1* | 3/2009 | Birchwood et al. | 702/11 |
| 2009/0185446 A1* | 7/2009 | Zheng et al. | 367/31 |
| 2009/0204330 A1* | 8/2009 | Thomsen et al. | 702/14 |
| 2009/0228299 A1* | 9/2009 | Kangarloo et al. | 705/2 |
| 2009/0259406 A1* | 10/2009 | Khadhraoui et al. | 702/14 |
| 2009/0296524 A1* | 12/2009 | Meier | 367/38 |
| 2010/0226207 A1* | 9/2010 | Armstrong | 367/57 |

* cited by examiner

METHOD AND APPARATUS FOR SEPARATING AND COMPOSING SEISMIC WAVES

FIELD OF THE INVENTION

Embodiments of the invention relate to a multi-component seismic data processing, and more particularly, to providing method and apparatus for separating and composing seismic waves for the multi-component seismic data processing.

BACKGROUND

In multi-component seismic detection and exploration, seismic waves are the target waves which indicate the structure and attribute of the earth. In general, the seismic waves comprise two independent seismic sections of the primary wave (P-wave) and the shear wave (S-wave) and commonly follow ray paths refracted by the varying density and modulus (stiffness) of the Earth's interior. In low-velocity zone of earth mantle, P-waves are often considered to be received by the vertical components and S-waves by the horizontal components.

However, real data records, P-wave and S-wave vectors are polar linearly in general, show that it is not true and precise in many areas with relatively high-velocity zone, and such phenomenon known as "mode leakage". In other words, there is potential cross-contamination of P-wave energy on the horizontal components and S-wave energy on the vertical components. Therefore, suppression of mode leakage, namely wave separation (separation of P- and S-waves), become a critical aspect and difficult issue for the multi-component seismic data processing.

Conventionally, there are two major groups of methods for P and S-wave separation. One group is the scalar-processing method using a domain transformation, such as the f-k method or the Tao-p method. The other group is the vector-processing method that separate different wave motions and recover their amplitudes based on the polarization characteristics, such as the direct mapping method or the polarization method.

Expressions for wavefield separation have previously been derived by for instance Dankbaar, J. W. M., 1985, Separation of P- and S-waves: Geophys. Prosp., 33, 970-986 (hereinafter referred to as the Dankbaar), and these have been applied to seismic data in conventional recording geometries.

In CN patent application entitled "System and method for seismic wavefield separation" (CN Patent Publication No. CN1404582A, hereinafter referred to as the 582 application.) The 582 application applies filtering technique in the spatial domain to convert vertical spatial derivatives to horizontal derivatives and calculate all spatial derivatives of the wavefield based on the wavefield separation of Dankbaar. In addition, the 582 application resolves some drawbacks of Dankbaar, such as use limitations of low/dropping velocity zone of the near-surface, and adjusts error occurred for wavefield separation in anisotropic near-surface.

In CN patent application entitled "Method for synthesizing X and Z component wave field vector" (CN Patent Publication No. CN101251603A, hereinafter referred to as the 603 application.) The 603 application applies wave velocity analysis method to project two components for wave separation. Such projection neglects important features of three-component of explored seismic datum, and results in poor amplitude preservation, improper migration and low imaging resolution, especially to some areas contained the mode leakage with complex structures or thinnish low/dropping velocity zone.

In CN patent application entitled "Method for separating seismic wave fields of different types in two-dimensional vertical seismic profile" (CN Patent Publication No. CN101630017A, hereinafter referred to as the 017 application.) The 017 application separates the waves by using an inverse transformation from VSP data under a coordinate system for three-component seismic array data. However, the 017 failed to recover amplitudes of separated waves after separating using the inverse transformation method, which can not effective provide the full amplitudes of separated waves.

Accordingly, although above mentioned patent applications may realize the wave separation, the applications failed to recover the true amplitudes for vectors of separated waves. Because of the mode leakage phenomenon, the waveforms left after suppression of the mode leakage generally are not the actual true amplitudes. The cross-contamination of P-wave energy on the horizontal components and S-wave energy on the vertical components are becoming the partially projected waves.

Therefore, there is a need for an approach to provide a mechanism that can adapt to the wave separation of a seismic wave with suppressed mode leakage and generates separated P-wave and S-wave with true amplitudes.

SOME EXEMPLARY EMBODIMENTS

These and other needs are addressed by the invention, wherein an approach is provided for multi-component seismic data processing that separates P-type and S-type seismic waves, namely a primary wave (P-wave) and a shear wave (S-wave) in an affine coordinate system.

According to one aspect of an embodiment of the invention, a method for separating and composing seismic waves comprises act of determining base vectors of a P- and a S-wave vectors respectively in each quadrant of a Descartes coordinate system during a sliding time window by using a vector composition method, wherein the Descartes coordinate system has a first and a second axes. The method further comprises an act of decomposing of P and S-wave vectors along the first and second axes, which are corresponded to the sliding time window, forming a non-orthogonal affine coordinate system P-O-S using directions of the P- and S-wave vectors as axes, and acquiring P- and S-wave vectors respectively by transforming the affine coordinate system from the Descartes coordinate system based on angles between the axes of the coordinate system and the decomposed vectors of the P- and S-wave. The method further comprises acts of decomposing the P- and S-wave vectors by affine coordinate system transformation in the same sliding time window, and selecting vectors of the P- and S-wave vectors that are paralleled to the base vectors of the P- and the S-waves.

According another aspect of an embodiment of the invention, an apparatus for separating and composing seismic waves comprises a storage device and a processing device. The processing device comprises a composing unit, a sampling unit, a transformer and a reparatory unit. The composing unit composes vectors of acquired seismic waves in each sliding time window, generates base vectors of the seismic waves and stores the base vectors of the seismic waves to the storage device. The sampling unit samples the seismic waves in the sliding time windows sequentially and generates sample datum corresponded to the sliding time windows. The transformer is connected to the sampling unit, transforms the sample datum to obtain angles for the transformation of two coordinate systems, and stores the angles to the storage device. The reparatory unit is connected to the storage device, separates the wave vectors according to the base vectors of the seismic waves and generates signals with true amplitudes based on the transformation of two coordinate systems. The angles and base vectors are retrieved from the storage device.

Accordingly, comparing to the conventional multi-component seismic data processing, the method in accordance with embodiments of the present invention provides the seismic wave separation with high degree of amplitudes recovery, and reduces noises of the seismic waves simultaneously. Such reduction of noises provide more precisely seismic data that satisfies the requirement of seismic data analysis and processing.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF THE PREFERRED EMBODIMENT

A system, method, and software for multi-component seismic data processing for separating P- and S-type seismic waves in an affine coordinate system are disclosed. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the embodiments of the invention.

With reference to FIGS. 1A-1G, the seismic wave, according to one embodiment, travels through the earth and inherently includes a primary-wave (P-wave) and a shear-wave (S-wave). A method for separating and composing seismic waves, in accordance with an embodiment of the present invention, comprises acts of S21 determining base vectors of the seismic waves, S22 transforming and separating the seismic wave to an affine coordinate system, and S23 obtaining a signal with true amplitudes and eliminating a mode leakage phenomenon.

Figure 1A:
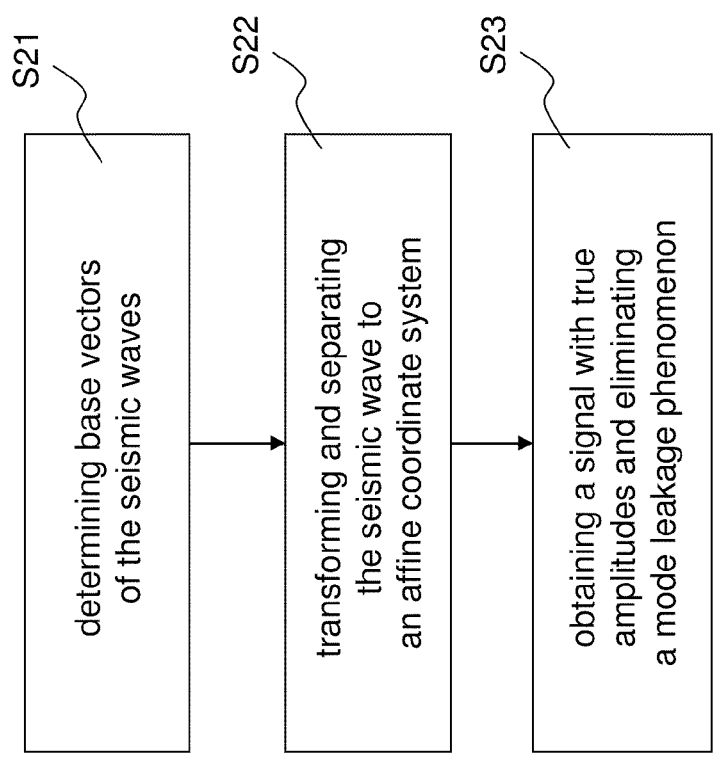
FIGS. 1A-1G are flowcharts of a process for separating and composing seismic waves, in accordance with embodiments of the invention.
Figure 1B:
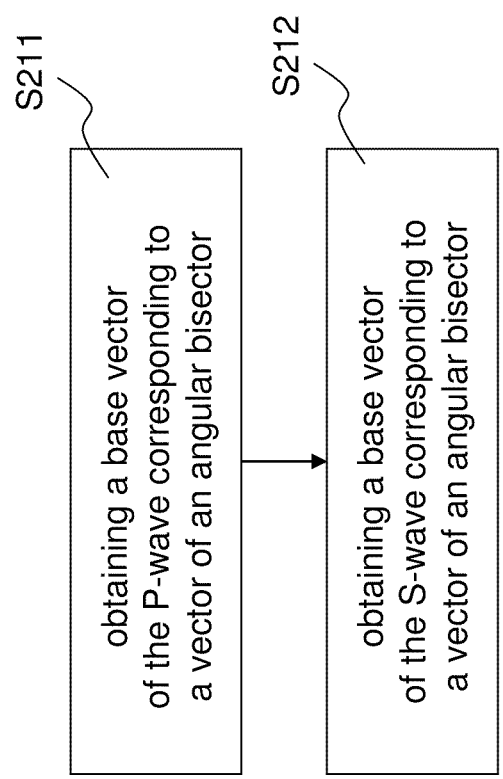
Figure 1C:
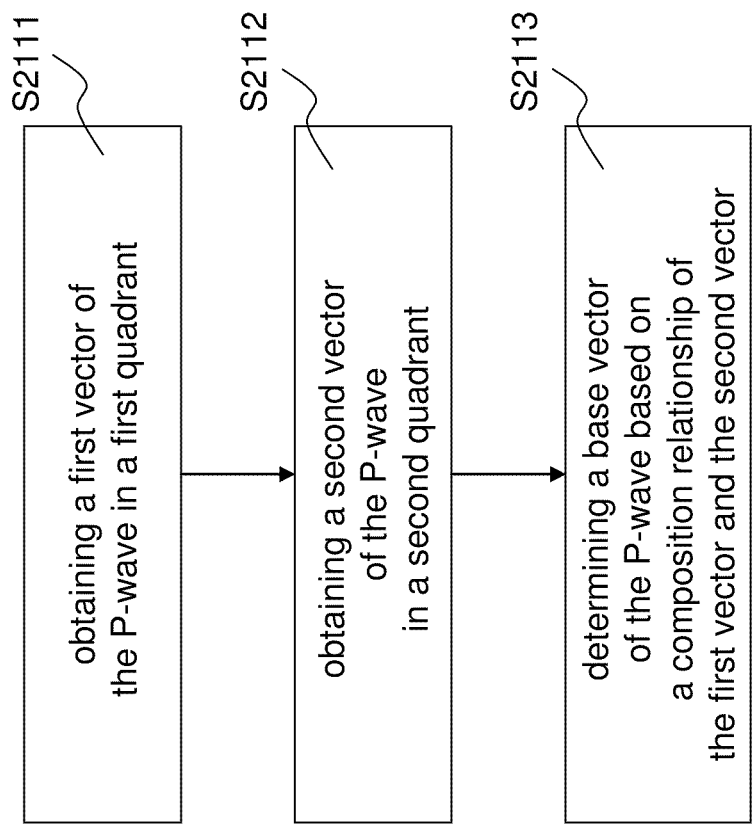
Figure 1D:
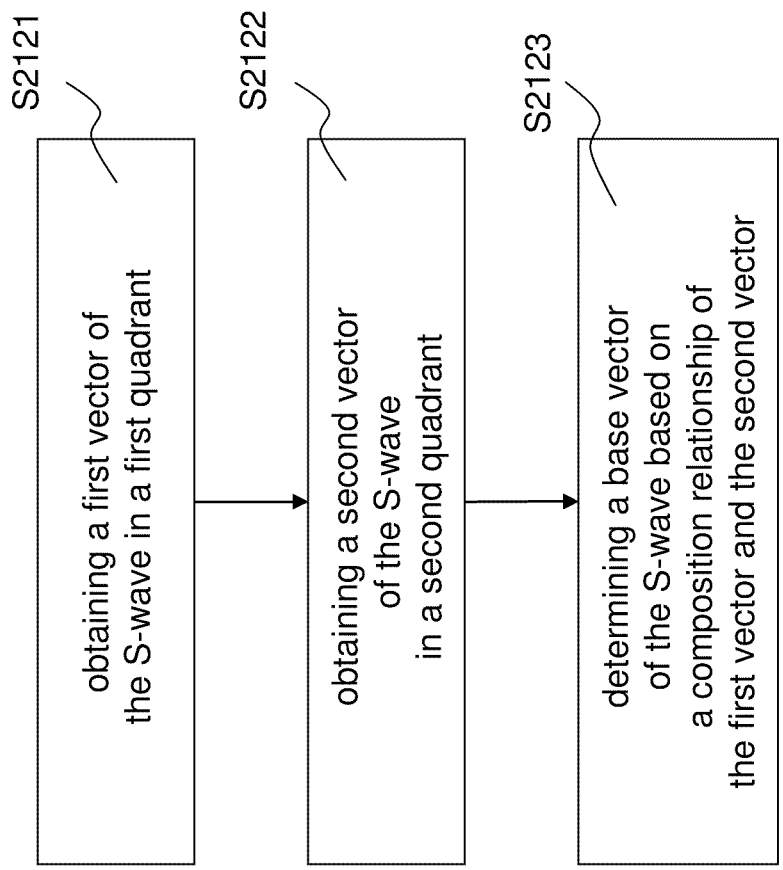

With reference to FIGS. 1A and 1B, the propagating direction of the seismic wave (i.e., P- or S-wave) from underground toward ground surface is expressed in a two-dimensional coordinate system. In general, the two-dimensional coordinate system has four quadrants. The act of S21 determining base vectors of the seismic waves is implemented with a vector compositions and comprises acts of S211 obtaining a base vector of the P-wave corresponding to a vector of an angular bisector and acts of S212 obtaining a base vector of the S-wave corresponding to a vector of an angular bisector.

Figure 2:
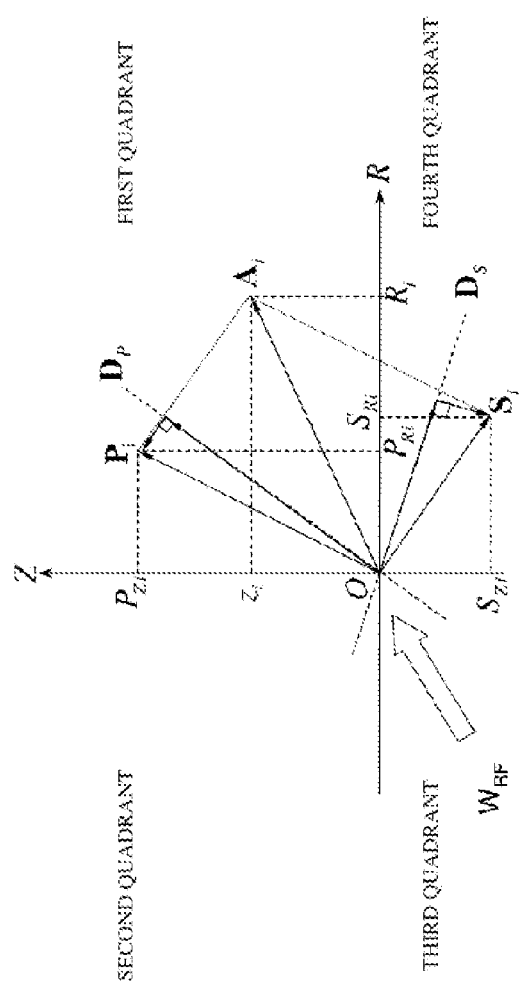
FIG. 2 is a diagram of exemplary components of a seismic wave in a coordinate system, in accordance with an embodiment of the invention.

With reference to FIG. 2, FIG. 2 is a diagram of exemplary components of a seismic wave in a coordinate system. According to one embodiment of the present invention, the coordinate system is defined into a two-dimensional R-O-Z coordinate system. The R-O-Z coordinate system has an R-axis, a Z-axis and an origin O. The Z-axis indicates a vertical direction of ground. The R-axis along with the direction of ground and forms a right-handed coordinate system. The origin O indicates an exiting point of the seismic wave toward ground surface.

In this example, as shown in FIG. 2, assuming a P-wave $P_i$ has a wave vector $D_P$ and a positive angle of 30 degrees (30°) between the wave vector $D_P$ and the Z-axis. An S-wave has a wave vector $D_S$ and a positive angle of 110 degrees) (110° between the wave vector $D_S$ and the Z-axis. The calculation of a vector of an angular bisector $D_P$ has the following relationship:

$$D_P = \frac{1}{\sqrt{2}} e_R + \frac{1}{\sqrt{2}} e_Z;$$

wherein $e_R$ is a base vector of the R-axis and $e_Z$ is a base vector of the Z-axis.

However, as shown in FIG. 2, since the P-wave $P_i$ is most distributed in the first and third quadrants, the base vector of the P-wave can be obtained by compositing the P-wave vectors in the first and third quadrants respectively. Therefore, with reference to FIGS. 1B and 1C, the acts of S211 obtaining a base vector corresponding to an angular bisector of the P-wave further comprises acts of S2111 obtaining a first vector $D_{P1}$ of the P-wave in a first quadrant (i.e., the first quadrants of the R-O-Z coordinate system as shown in FIG. 2), S2112 obtaining a second vector $D_{P2}$ of the P-wave in a second quadrant (i.e., the third quadrants of the R-O-Z coordinate system as shown in FIG. 2), and S2113 determining a base vector $D_P$ of the P-wave based on a composition relationship of the first vector $D_{P1}$ and the second vector $D_{P2}$. The composition relationship has the following relationships:

$$D_P = \frac{D_{P1} - D_{P2}}{|D_{P1} - D_{P2}|}, D_{P1} \neq D_{P2}; D_P = 0, \text{ if } D_{P1} = D_{P2} = 0; \text{ and}$$

$$D_P = \frac{D_{P1}}{D_{P2}}, (D_{P1} = D_{P2}) \neq 0.$$

In this example, the base vector $D_P$ can be determined by $$\frac{D_{P1} - D_{P2}}{|D_{P1} - D_{P2}|},$$

because $D_{P1}$ is not equal to $D_{P2}$. Each vector (i.e., the first vector $D_{P1}$ and the second vector $D_{P2}$) of the P-wave for composition for the first vector $D_{P1}$ are selected in an acute angle smaller than 90 degrees (90°) to the angular bisector D. Each vector of the P-wave for composition for the second vector $D_{P2}$ are selected in an obtuse angle greater than 90 degrees (90°) to the angular bisector D.

Similarly, the S-wave $S_i$ is most distributed in the second and fourth quadrants, as shown in FIG. 2, the base vector of the S-wave can be obtained by compositing the S-wave vectors in the second and fourth quadrants respectively. $D_S$ has the relationship of $D_S=1/\sqrt{2}e_R-1/rl;\sqrt{2}rlxe_Z$. Therefore, with reference to FIGS. 1B and 1D, the acts of S212 obtaining a base vector corresponding to an angular bisector of the S-wave further comprises acts of S2121 obtaining a first vector $D_{S2}$ of the S-wave in a first quadrant (i.e., the second quadrants of the R-O-Z coordinate system as shown in FIG. 2), S2122 obtaining a second vector $D_{S2}$ of the S-wave in a second quadrant (i.e., the fourth quadrants of the R-O-Z coordinate system as shown in FIG. 2), and S2123 determining a base vector $D_S$ of the S-wave based on a composition relationship of the first vector $D_{S1}$ and the second vector $D_{S2}$. The composition relationship has the following relationships:

$$D_S = \frac{D_{S1} - D_{S2}}{|D_{S1} - D_{S2}|}, D_{S1} \neq D_{S2}; D_S = 0, \text{ if } D_{S1} = D_{S2} = 0; \text{ and}$$

$$D_S = \frac{D_{S1}}{D_{S2}}, (D_{S1} = D_{S2}) \neq 0.$$

In this example, the base vector $D_S$ can be determined by $$\frac{D_{S1} - D_{S2}}{|D_{S1} - D_{S2}|},$$

because $D_{S1}$ is not equal to $D_{S2}$. Each vector of the S-wave for composition for the first vector $D_{S1}$ are selected in an acute angle smaller than 90 degrees (90°), which is measured between the angular bisector D and the corresponding vector in the first quadrant. Each vector of the S-wave for composition for the second vector $D_{S2}$ are selected in an obtuse angle greater than 90 degrees (90°), which is measured between the angular bisector D and the corresponding vector in the second quadrant.

In addition, in order to obtain the more precise base vectors of the P- and S-waves, the above-mentioned acts of S2111 to S2113 and S2121 to S2123 may be repeated several times (e.g., 2-3 times) by replacing the old vector of the angular bisector D as the determined base vector DP or base vector DS.

When the base vectors of P- and S-waves are respectively determined, the P- and S-waves' separation can soon be determined for obtaining signals with true amplitudes and eliminating the mode leakage phenomenon.

Figure 1E:
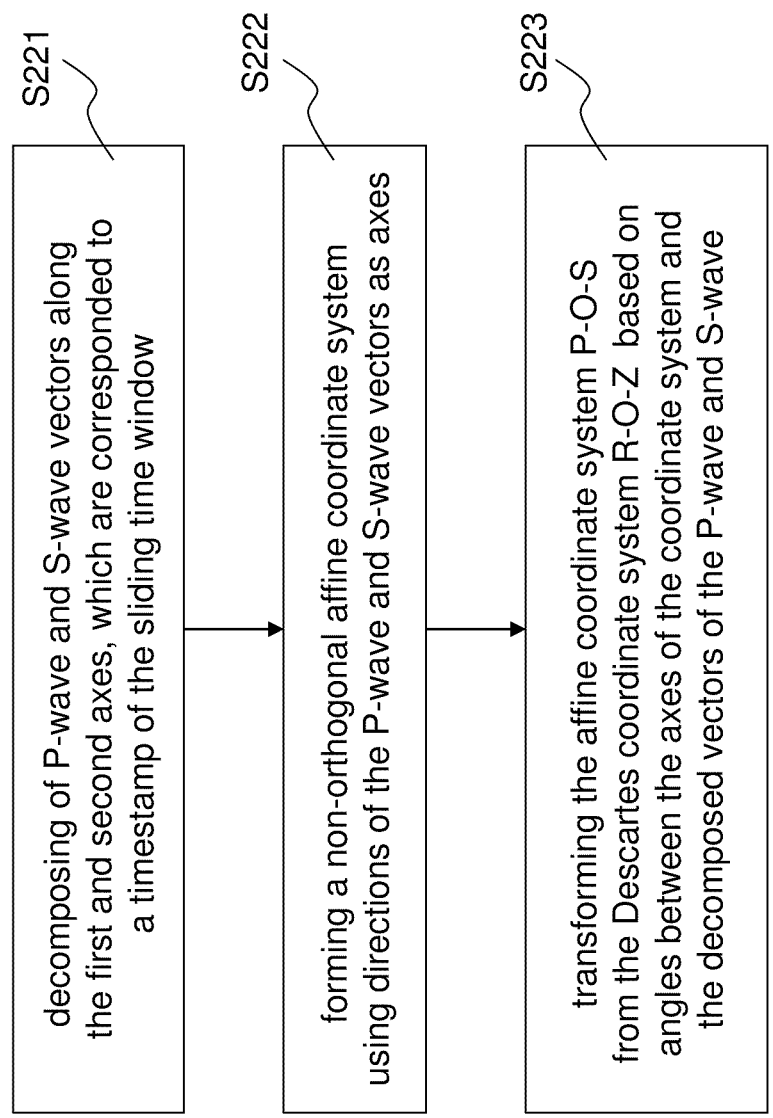

Accordingly, with reference to FIGS. 1A and 1E, the acts of S22 transforming and separating the seismic wave to an affine coordinate system comprises acts of S221 decomposing of P- and S-wave vectors along the first and second axes, which are corresponded to the central sampling point of a sliding time window, S222 forming a non-orthogonal affine coordinate system using directions of the P- and S-wave vectors as axes, and S223 transforming the affine coordinate system from the Descartes coordinate system R-O-Z based on angles between the axes of the coordinate system and the decomposed vectors of the P-wave and S-wave.

Using FIG. 2 as a diagram describing the transformation relationship of a two-dimensional R-O-Z coordinate system and a non-orthogonal affine coordinate system. In one embodiment of the present invention, assuming a reflected waves $W_{RF}$ propagates from the third quadrant (i.e., underground) to the first quadrant. It is noted that one of ordinary skill in the art would recognize that a $P_i$ and a $S_i$ are the wave vectors of P- and S-waves, wherein i indicates a sample time of the reflected waves $W_{RF}$ toward the coordinate system. The sliding time window is applied to range vectors of $P_i$ and $S_i$ corresponding to it, wherein the sampling time is configured between two half of the time window, which indicates a center of the time window length.

It is also noted that the method of the embodiment in accordance with the present invention reduces analysis time and precise determination for the wave vectors because of the use of the angular bisector as the base vector and the moving sliding time window method.

As previously described, the $e_R$ is a base vector of the R-axis and $e_Z$ is a base vector of the Z-axis, therefore, $P_i$ and $S_i$ can be decomposed as following:

$$P_i = P_{Ri}e_R + P_{Zi}e_Z,$$

$$S_i = S_{Ri}e_R + S_{Zi}e_Z$$

wherein $P_{Ri}$, $P_{Zi}$, $S_{Ri}$ and $S_{Zi}$ are modulus of $P_i$ and $S_i$ respectively.

Figure 1F:
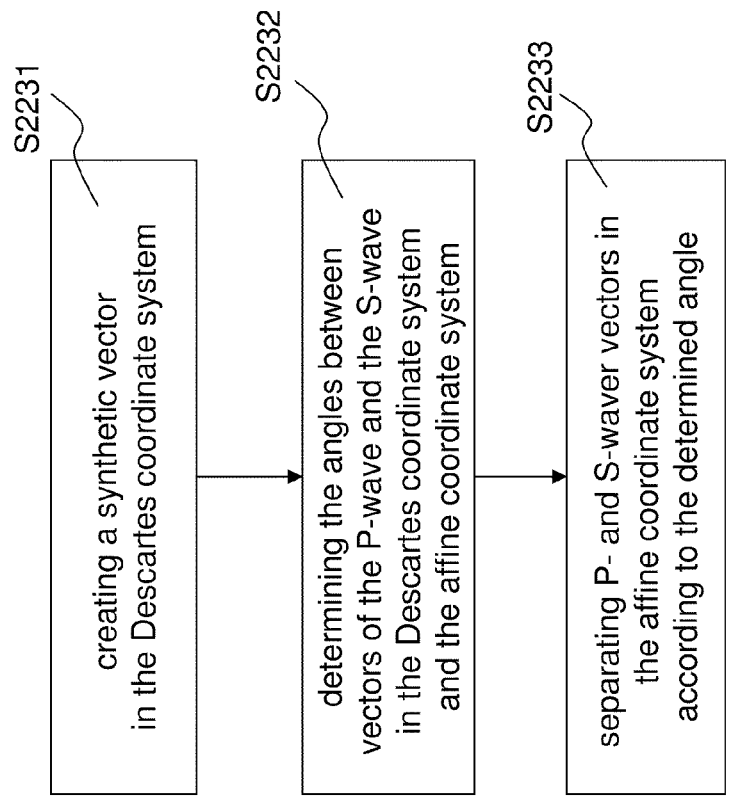

Since $P_i$ and $S_i$ are decomposed into modulus and base vectors. With reference to FIGS. 1A and 1F The acts of S222 forming a non-orthogonal affine coordinate system using directions of the P-wave and S-wave vectors as axes can be created easily. In this example, using directions of the vectors of $P_i$ and $S_i$ as axes of the affine coordinate system, and further defined it as a P-O-S affine coordinate system.

The acts of S223 transforming the affine coordinate system from the Descartes coordinate system R-O-Z then comprises acts of S2231 creating a synthetic vector $A_i$ in the Descartes coordinate system, S2232 determining the angles between vectors of $P_i$ and $S_i$ in the Descartes coordinate system and the affine coordinate system, and S2233 separating P- and S-waver vectors in the affine coordinate system according to the determined angle.

The synthetic vector $A_i$ is a composed wave vector of $P_i$ and $S_i$, and thus has following relationship:

$$A_i = P_i + S_i = (P_{Ri} + S_{Ri})e_R + (P_{Zi} + S_{Zi})e_Z.$$

Sequentially, One of ordinary skill in the art would recognize again that base vectors (i.e., base vector of the synthetic vector $A_i$) of the R-O-Z coordinate system can transformed by using a tensor matrix to rewrite the relationship of the synthetic vector $A_i$. The base vectors of tensor matrix can be expressed as following:

$$\begin{bmatrix} Z_i \\ R_i \end{bmatrix} = \begin{bmatrix} \cos(e_P, e_Z) & \cos(e_S, e_Z) \\ \cos(e_P, e_R) & \cos(e_S, e_R) \end{bmatrix} \begin{bmatrix} P_i \\ S_i \end{bmatrix}.$$

Therefore, the angles between base vectors of R-O-Z and P-O-S coordinate system can be determined by inversing the tensor matrix. The inversed tensor matrix can be expressed as following:

$$\begin{bmatrix} P_i \\ S_i \end{bmatrix} = \begin{bmatrix} \cos(e_P, e_Z) & \cos(e_S, e_Z) \\ \cos(e_P, e_R) & \cos(e_S, e_R) \end{bmatrix}^{-1} \begin{bmatrix} Z_i \\ R_i \end{bmatrix};$$

wherein $(e_P, e_Z)$ indicates the angle between the base vectors of $P_i$ and the Z-axis, $(e_S, e_Z)$ indicates the angle between the base vectors of $S_i$ and the Z-axis, $(e_P, e_R)$ indicates the angle between the base vectors of $P_i$ and the R-axis, and $(e_S, e_Z)$ indicates the angle between the base vectors of $S_i$ and the R-axis.

The vectors of $P_i$ and $S_i$ can be plotted easily in the affine coordinate system based on the angle difference. It is noted that the key to the P- and S-wave separation is to know the angle difference for each vector between the Descartes coordinate system and the affine coordinate system.

The reason behind the above arrangement for plotting the affine coordinate system is that vectors of the P- and the S-wave in the affine coordinate system are eliminated as residual signals when the eliminated vectors are orthogonal to the base vectors of the P- and the S-waves in the Descartes coordinate system (i.e., the R-O-Z coordinate system).

Figure 1G:
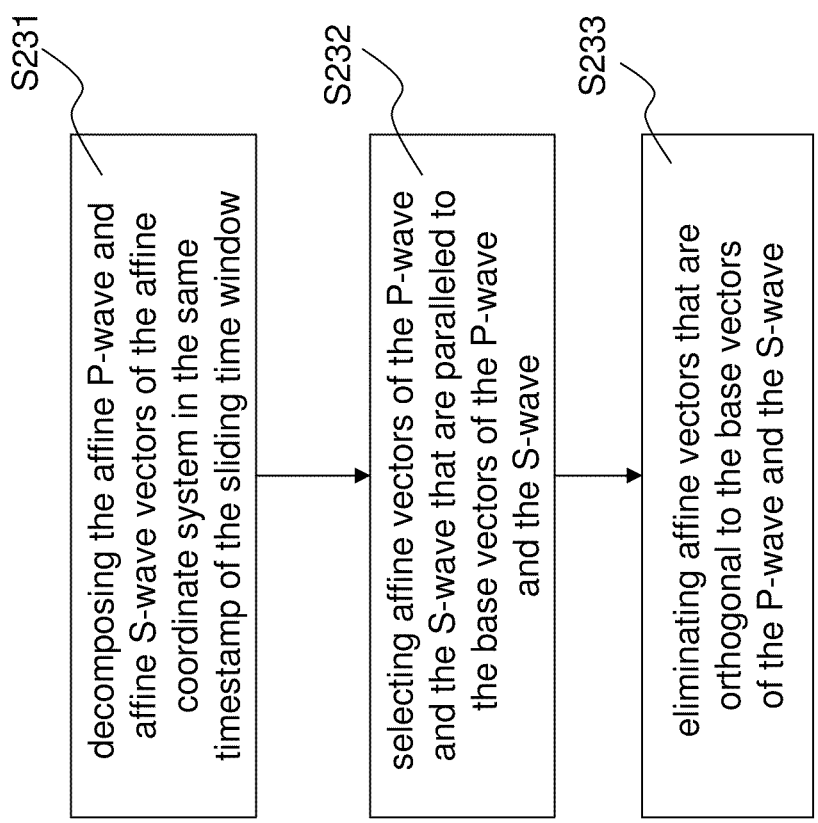

Accordingly, with reference to FIGS. 1A and 1G, the acts of S23 obtaining a signal with true amplitudes and eliminating a mode leakage phenomenon comprises acts of S231 decomposing the P- and S-wave vectors in the affine coordinate system in the sliding time window, S232 selecting vectors of P- and S-waves in the affine coordinate system that are paralleled to the base vectors of the P- and S-waves, and S233 eliminating vectors that are orthogonal to the base vectors of the P- and the S-waves. The selected vectors of $P_{it}$ and $S_{it}$ are reserved as the signal with true amplitudes, which has the following relationship:

$$\begin{cases} P_{it} = D_P \cdot P_i \\ S_{it} = D_S \cdot S_i \end{cases}.$$

The eliminated vectors of $P_{in}$ and $S_{in}$ are reserved as noise signal, which has the following relationship:

$$\begin{cases} P_{in} = P_i - P_{it} \\ S_{in} = S_i - S_{it} \end{cases}.$$

In this manner, the embodiment in accordance with the present invention reduces noises of the seismic waves, achieves the wave separation and recovers the amplitudes of separated waves (i.e., the P- and the S-waves) simultaneously. Such reductions of noises provide more precisely seismic data that satisfies the requirement of seismic data analyses and processing.

Figure 3C:
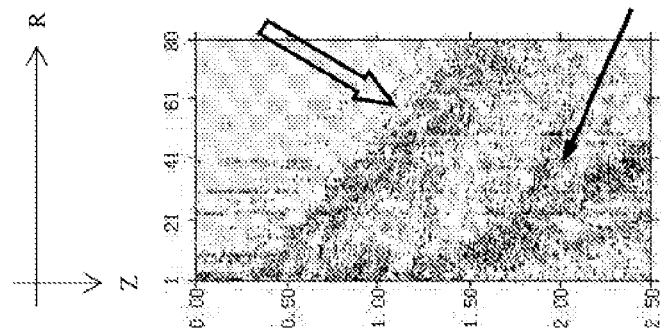
FIGS. 3A-3F are exemplary graphs of components of seismic waves in the first and third axes of a coordinate system of FIG. 2, according to an embodiment of the invention.
Figure 3B:
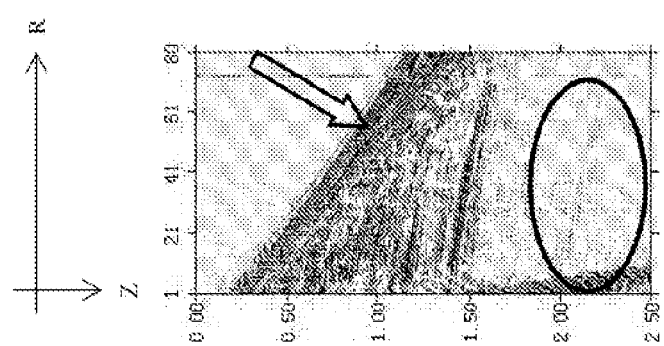
Figure 3A:
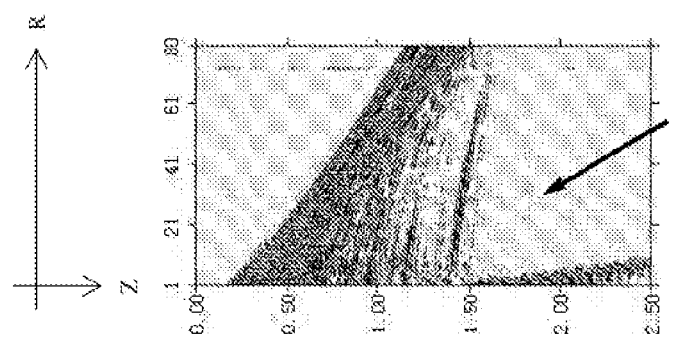
Figure 3F:
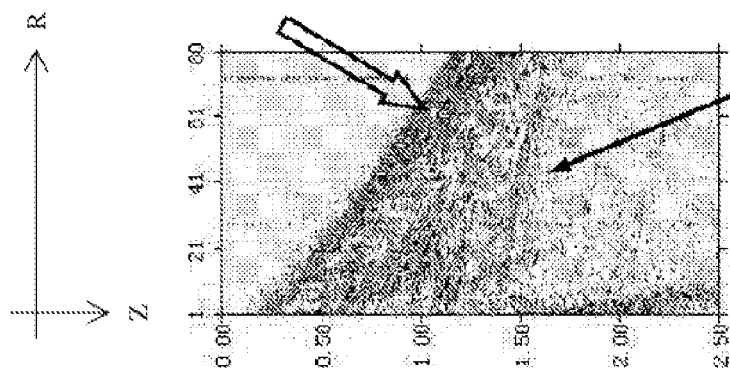
Figure 3E:
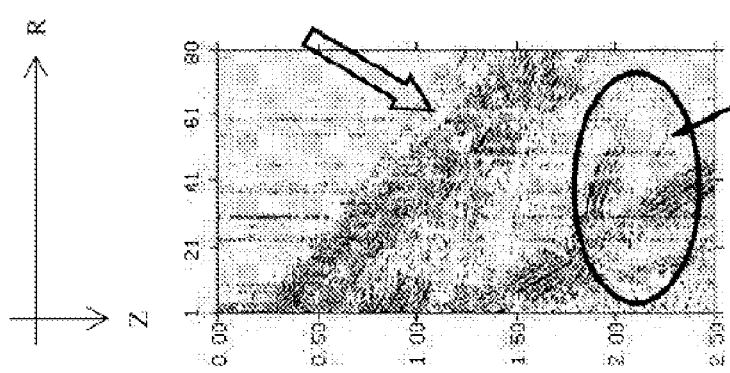
Figure 3D:
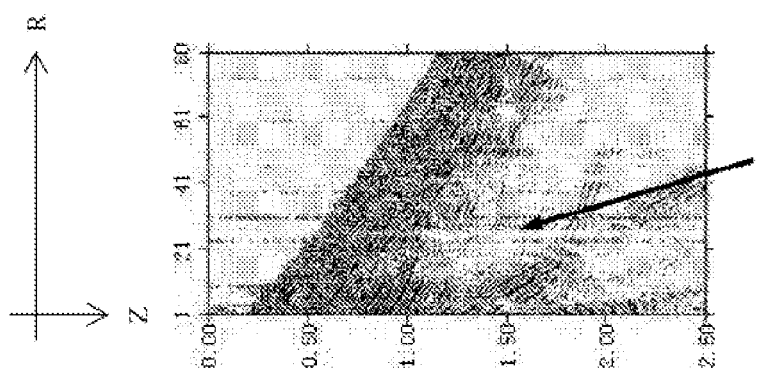

With reference to FIGS. 3A-3F, FIGS. 3A-3F are exemplary graphs of components of seismic waves in the first and second axes (i.e., R-axis and Z-axis) of a coordinate system respectively. FIGS. 3A and 3D illustrate the components of original seismic waves in the first and second axes (i.e., R-axis and Z-axis) respectively, which contain the mode leakage phenomenon. FIGS. 3B and 3E are graphs for separated waves corresponded to FIGS. 3A and 3D respectively. FIGS. 3C and 3F are graphs for eliminated noise signals corresponded to FIGS. 3A and 3D respectively.

In this example, the original seismic data are sensed and explored from Quaternary of an oil field with 100 meters thick. The wave separation for the P- and the S-waves use a sliding time window in 20 meters per second (20 ms). By comparing points of solid arrows of the FIGS. 3C and 3E, the FIG. 3C shows residual noise signals on the first axis (i.e., Z-axis) are significantly eliminated. By comparing points of solid arrows of the FIGS. 3D and 3F, the FIG. 3F shows residual noise signals and P-waves on the second axis (i.e., R-axis) are effectively eliminated simultaneously the P-waves (shown points of open arrows) as are remained without damage. In addition, as shown in the ellipse boundary, the random residual noise signals are suppressed and the amplitudes of the P-wave and the S-wave are recovered.

One of ordinary skill in the art would recognize that the processes for the method, as above mentioned, for separating and composing seismic waves may be implemented via software, hardware (e.g., general processor (i.e., Micro Processor Unit (MPU) or Central Processor Unit (CPU)), an Application Specific Integrated Circuit (ASIC), Field Programmable Gate Arrays (FPGAs), etc.), firmware, or a combination thereof. Such exemplary hardware for performing the described functions is detailed below with respect to FIG. 4.

Figure 4:
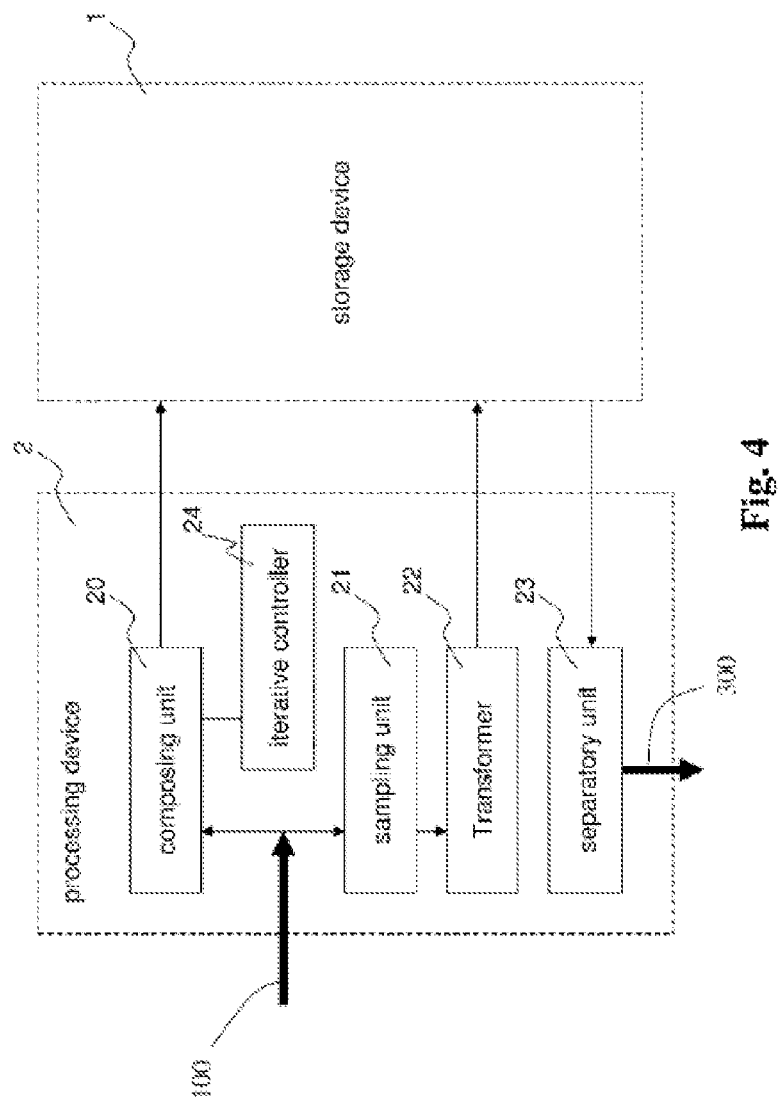
FIGS. 4 and 5 are exemplary hardwares upon which embodiments according to the invention can be implemented.
Figure 5:
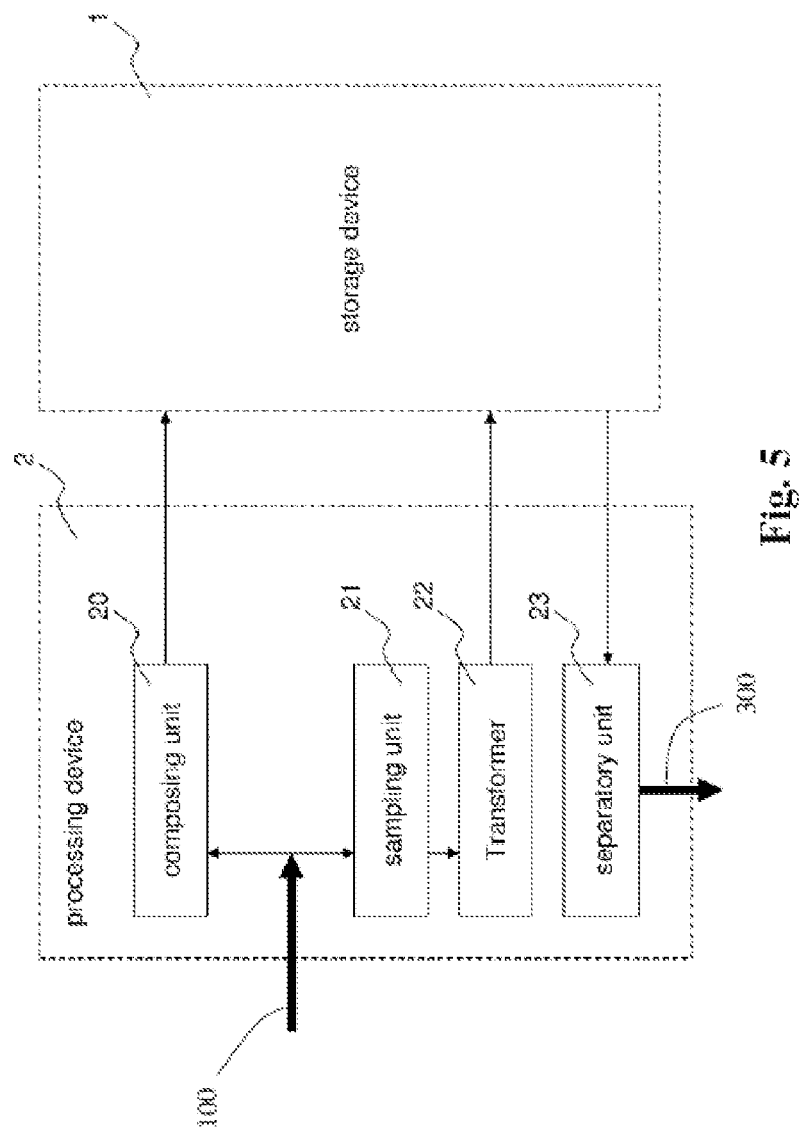

With reference to FIGS. 4 and 5. An apparatus, as shown in FIG. 5, for separating and composing seismic waves 100 comprises a storage device 1 and a processing device 2.

The processing device 2 comprises a composing unit 20, a sampling unit 21, a transformer 22 and a separatory unit 23. The composing unit 20 composes vectors of the explored seismic waves 100 in a sliding time windows, generates base vectors of the seismic waves 100 and stores the base vectors of the seismic waves to the storage device 1.

The sampling unit 21 sequentially samples the seismic waves in a sliding time windows and generates sample datum corresponded to the sliding time windows. The transformer 22 is connected to the sampling unit 21, transforms the sample datum to obtain P- and S-wave vectors in an affine coordinate system, and stores the vectors of the P- and S-waves to the storage device 1.

The separatory unit 23 is connected to the storage device 1, separates the affine vectors according to the base vectors of the seismic wave and generates signals 300 with true amplitudes based on the separated vectors of the P- and S-waves. The wave vectors and base vectors are retrieved from the storage device 1.

In order to obtain more precise base vectors of the P- and S-waves, in another embodiment as shown in FIG. 4, the processing device further comprises an iterative controller 24. The iterative controller 24 is connected to the composing unit 20, and controls the composing unit 20 to repeat the composition of the vectors of the explored seismic waves.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for separating and composing seismic waves, the seismic wave having a primary wave (P-wave) and a shear (S-wave), the method is operated using a processing device, and comprising acts of:

determining base vectors of the P-wave and S-wave vectors respectively in each quadrant of a Descartes coordinate system R-O-Z during a sliding time window by using a vector composition method, and comprising:
  obtaining a base vector of the P-wave corresponding to a vector of an angular bisector, and comprising:
    obtaining a first vector $D_{P1}$ of the P-wave;
    obtaining a second vector $D_{P2}$ of the P-wave; and
    determining a base vector $D_P$ of the P-wave based on a composition relationship of the first vector $D_{P1}$ and the second vector $D_{P2}$, wherein the first vector $D_{P1}$ are selected in an acute angle to the angular bisector, and the second vector $D_{P2}$ are selected in an obtuse angle to the angular bisector; and
  obtaining a base vector of the S-wave corresponding to a vector of an angular bisector;
decomposing of P-wave and S-wave vectors along the first and second axes, which are corresponded to a sliding time window;
forming a non-orthogonal affine coordinate system using directions of the P-wave and S-wave vectors as axes;
transforming the non-orthogonal affine coordinate system from the Descartes coordinate system R-O-Z based on angles between the axes of the coordinate system and the decomposed vectors of the P-wave and S-wave;
decomposing the P-wave and S-wave vectors in the sliding time window; and
selecting vectors of the P-wave and S-waves that are paralleled to the base vectors of the P-wave and S-wave, wherein the selected affine vectors of P-wave and S-wave are signals with true amplitudes.

2. The method as claimed in claim 1, wherein the Descartes coordinate system R-O-Z has a first axis, a second axis and an origin O, the first axis is defined as an R-axis, the second axis is defined as a Z-axis, wherein the Z-axis indicates a vertical direction of ground, the R-axis along with direction of ground and forms a right-handed coordinate system, and the origin O indicates an exiting point of the seismic wave toward ground.

3. The method as claimed in claim 1, wherein the acts of obtaining a base vector of the S-wave corresponding to a vector of an angular bisector comprises:
  obtaining a first vector $D_{S1}$ of the S-wave;
  obtaining a second vector $D_{S2}$ of the S-wave; and
  determining a base vector $D_S$ of the S-wave based on a composition relationship of the first vector $D_{S1}$ and the second vector $D_{S2}$, wherein the first vector $D_{S1}$ are selected in an acute angle to the angular bisector, and the second vector $D_{S2}$ are selected in an obtuse angle to the angular bisector.

4. The method as claimed in claim 1, further comprising repeating the acts of determining base vectors of a P-wave and a S-wave vectors respectively by replacing the old vector of the angular bisector as the determined base vector.

5. The method as claimed in claim 1, wherein the decomposed vector of the P-wave and S-waves are expressed as following:

$P_i = P_{Ri} e_R + P_{Zi} e_Z$, $S_i = S_{Ri} e_R + S_{Zi} e_Z$ wherein $P_i$ and $S_i$ indicates the P-wave and S-wave vectors in $i^{th}$ sampling time, $e_R$ is a base vector of the first axis and $e_Z$ is a base vector of the second axis, and $P_{Ri}$, $P_{Zi}$, $S_{Ri}$ and $S_{Zi}$ are modulus of $P_i$ and $S_i$.

6. The method as claimed in claim 5, wherein the acts of transforming the affine coordinate system from the Descartes coordinate system R-O-Z comprises:
  creating a synthetic vector $A_i$ in the Descartes coordinate system R-O-Z, wherein the synthetic vector $A_i$ is a composed wave vector of $P_i$ and $S_i$, and thus has following relationship of $A_i = P_i + S_i = (P_{Ri} + S_{Ri}) e_R + (P_{Zi} + S_{Zi}) e_Z$;
  determining the angles between vectors of $P_i$ and $S_i$ in the Descartes coordinate system R-O-Z and the affine coordinate system; and
  separating the P-wave and S-wave vectors in the affine coordinate system according to the determined angle.

7. The method as claimed in claim 6, wherein the acts of determining the angles comprising:
  inversing a tensor matrix, wherein the tensor matrix is expressed as following:

$$\begin{bmatrix} Z_i \\ R_i \end{bmatrix} = \begin{bmatrix} \cos(e_P, e_Z) & \cos(e_S, e_Z) \\ \cos(e_P, e_R) & \cos(e_S, e_R) \end{bmatrix} \begin{bmatrix} P_i \\ S_i \end{bmatrix};$$

and
the inversed tensor matrix is expressed as following:

$$\begin{bmatrix} P_i \\ S_i \end{bmatrix} = \begin{bmatrix} \cos(e_P, e_Z) & \cos(e_S, e_Z) \\ \cos(e_P, e_R) & \cos(e_S, e_R) \end{bmatrix}^{-1} \begin{bmatrix} Z_i \\ R_i \end{bmatrix},$$

wherein
($e_P$, $e_Z$) indicates an angle between the base vectors of $P_i$ and the second axis;
($e_S$, $e_Z$) indicates an angle between the base vectors of $S_i$ and the second axis;
($e_P$, $e_R$) indicates an angle between the base vectors of $P_i$ and the first axis; and
($e_S$, $e_R$) indicates an angle between the base vectors of $S_i$ and the first axis.

8. The method as claimed in claim 7, wherein the sliding time window is applied using a moving sliding time window method to range vectors corresponding to a time window and the sampling time is configured between two half's of a time window, which indicates a center of a time window length.

9. The method as claimed in claim 6, wherein the selected affine vectors of the P-wave and the S-wave are the signals with true amplitudes, which has a following relationship:

$$\begin{cases} P_{it} = D_P \cdot P_i \\ S_{it} = D_S \cdot S_i \end{cases},$$

wherein
$P_{it}$ indicates the selected affine vector of the P-wave corresponded to the composed wave vector of $P_i$, and $S_{it}$ indicates the selected affine vector of the S-wave corresponded to the composed wave vector of $S_i$.

10. The method as claimed in claim 9, further comprising:
  eliminating vectors that are orthogonal to the base vectors of the P-wave and S-wave, wherein the eliminated vectors are the noise signal, which has the following relationship:

$$\begin{cases} P_{in} = P_i - P_{it} \\ S_{in} = S_i - S_{it} \end{cases},$$

wherein
$P_{in}$ indicates the eliminated affine vector of the P-wave, and $S_{in}$ indicates the eliminated affine vector of the S-wave.

\* \* \* \* \*